Aug. 26, 1930.   A. A. GLAWE ET AL   1,774,091

CLOSURE CAP

Filed June 29, 1928

Inventors
Ad. A. Glawe
Raymond E. Evrard
John H. Andrew
Daniel Brunn
Attorney.

Patented Aug. 26, 1930

1,774,091

UNITED STATES PATENT OFFICE

AD A. GLAWE, RAYMOND E. EVRARD, AND JOHN H. ANDREW, OF GREEN BAY, WISCONSIN

CLOSURE CAP

Application filed June 29, 1928. Serial No. 289,104.

The invention relates to improvements in closure and sealing caps and more particularly to a closure cap having novel and improved locking means associated therewith and designed for general use, but is especially adapted as a substitute for the filler cap of an automobile gasoline tank, or the like.

An object of the invention is to provide a combined closure cap and locking means therefor, which is adapted for connection with the usual filling neck of an automobile gasoline tank, or the like, without altering or modifying the construction of the filling neck or tank.

Another object of the invention is to provide a closure cap having locking means associated therewith, which will be simple in construction, easy and cheap to manufacture, neat in appearance, compact and durable, and highly efficient for carrying out the purpose for which it is designed.

A further object of the invention is to provide a combined closure cap and lock which is adapted to be received within the usual filling neck of an automobile gasoline tank, or the like, for securely sealing and locking the same, and which may be readily and easily applied to and removed from the said filling neck.

A still further object of the invention is to provide a combined closure cap and lock which is adapted to replace the filler cap of an automobile gasoline tank, or the like, and which has associated therewith a sealing ring adapted for securely sealing the said filling opening in said tank.

A still further object of the invention is to provide in combination with a closure cap and locking means therefor, a novel and improved sealing means for securely sealing the opening closed by said cap.

Generally stated, the invention consists in a closure cap having locking means associated therewith, said cap being adapted to be received within the usual filling opening in place of the filler cap therefor. The said locking means comprising a pair of normally projecting latch elements cooperating with the underside of an annular ring element rigidly secured to the interior face of the filling opening, and means associated with said locking means for withdrawing said latch elements when it is desired to remove said closure cap. In order to completely and securely seal the filling opening a sealing ring is provided on said closure cap, said ring being kept in yielding contact with the upper edge of said filling opening by means of springs or the like.

With the foregoing and other objects in view, which will appear as the description proceeds, the invention consists in the construction, arrangement and combination of parts of the apparatus whereby the objects contemplated are attained, as hereinafter more fully set forth, pointed out in the appended claims and illustrated in the accompanying drawings, in which:

Figure 1:
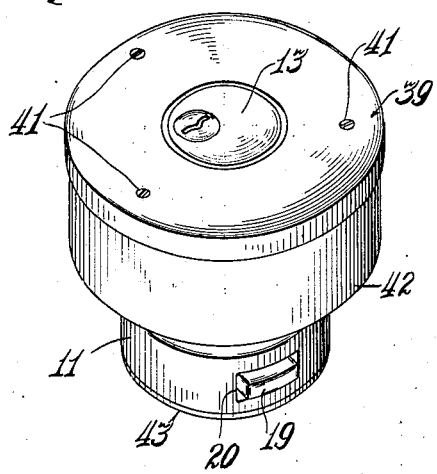
Fig. 1 shows a perspective view of the improved closure cap.

The closure cap, as illustrated, consists of a sleeve element 11 adapted to be received within the usual filling neck of a tank, or the like, having a central vertical bore 12 extending therethrough. Located in the upper end of the central bore 12 and fixedly held therein is a lock member 13 of any suitable and well known construction.

Extending downwardly a short distance from the lower end of the lock member 13 is a shaft 14, to the lower end of which is fixedly secured in any suitable manner, an operating eccentric or cam member 15 adapted to actuate a pair of locking or latch members to be hereinafter more fully described.

A pair of apertures 16 are provided in the wall of the sleeve element 11, adjacent the lower end thereof. In one of said apertures 16 is pivotally mounted on a pin 17, a latch member 18 having an enlarged free end 18' adapted to project through a slotted opening 20 provided therefor in the wall of the sleeve element 11. In the other one of said apertures 16, is pivotally mounted on a pin 17 a latch member 19 having an enlarged free end 19' adapted to project through a slotted opening 20 provided therefor in the wall of the sleeve element 11. The enlarged ends 18' and 19' normally extend through and beyond the wall of the sleeve element, and when in operative position engage under an annular retaining ring 21 rigidly secured to the interior wall of the filling neck 21$^s$, of the tank, by means of screws or the like.

This ring 21 provides with its lower edge an annular shoulder 22. The inner periphery 23 of the ring tapers outwardly and upwardly away from the shoulder 22 thereby providing a cam surface to facilitate the insertion of the closure cap, the projecting ends of the latch members being forced inwardly until they pass the shoulder 22.

Extending inwardly from one side of the latch element 19 is a projection 24, said projection being provided at the end thereof with an upstanding lug or extension 25. Secured on the under side of the projection 24, and extending downwardly therefrom is a pin 26; said pin is adapted to slidingly engage in a slotted aperture 27 provided therefor in an inwardly extending portion of the latch element 18, as shown at 28.

The upwardly extending lug 25 is positioned so that when the device is in assemble position it will be in contacting engagement with the eccentric or cam member 15 to be actuated thereby for actuating the latch elements 18 and 19 to move the same out of locking engagement with the annular ring 21.

Figure 3:
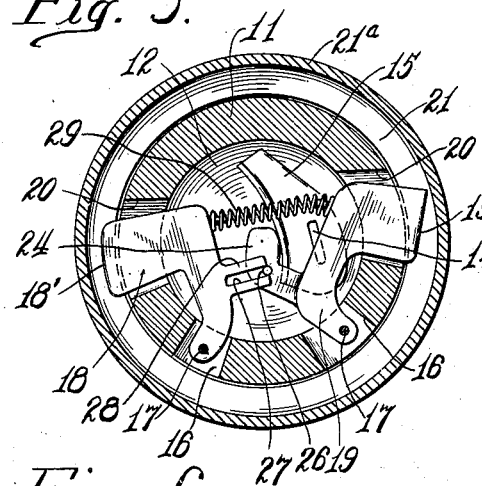
Fig. 3 is a horizontal sectional view of the closure cap as taken on line 3—3 of Fig. 2, looking in the direction of the arrows.
Figure 4:
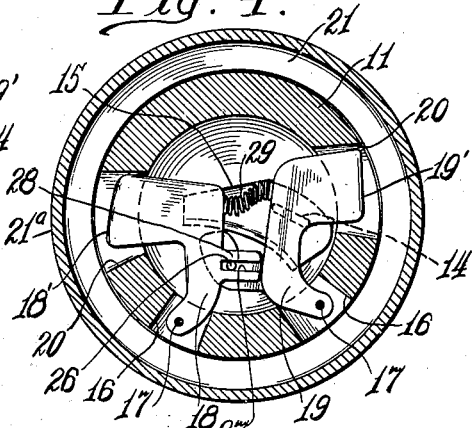
Fig. 4 is a view similar to Fig. 3, but showing the latch elements in their unlocked position.

To move the latch elements to their unlocked or withdrawn position, as shown in Fig. 4, the cam 15 is rotated by the manipulation of the lock 13, which causes the latch element 19 to swing inwardly about the pivot 17. The pin 26 riding in the slot 27 causes the inward movement of the latch member 18, thus the two latch members are simultaneously moved to their withdrawn or unlocked position. A compression spring 29 is interposed between the two latch members for normally holding these members in their extended or locked position, as shown in Fig. 3.

To insure against leakage or evaporation of the contents, such as gasoline, an annular metallic ring 31 is provided on the outside of the sleeve element 11, having secured on its under face another annular ring of fibrous material, such as felt or the like. This ring is yieldingly held against the upper edge of the filling neck when the cap is in locked position by means of a plurality of compression springs 33, which are held in position against accidental displacement by guide pins 34. The guide pins 34 are threaded into tapped openings 35 provided in the annular ring 31. Provided on their ends are heads 36 which are adapted to be received in the enlarged bores 37 provided in a shoulder portion 38 located at the upper end of the sleeve element 11. The pins 34, besides acting as guides for the springs 33, also are used for holding the ring 31 in place on the sleeve element 11, as the heads 36 of said pins limit the movement of the ring 31.

Figure 2:
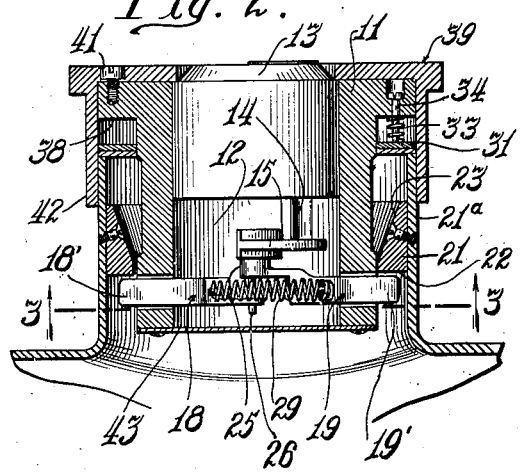
Fig. 2 is a central vertical sectional view through the closure cap showing same in its locked position within the filling neck of a tank.
Figure 6:
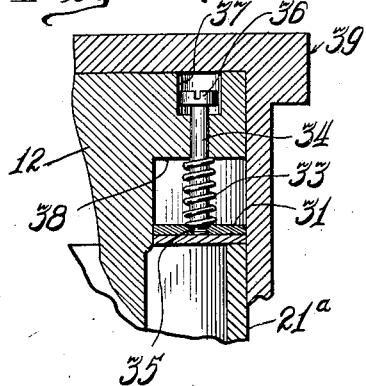
Fig. 6 is an enlarged fragmental sectional view of the closure cap showing the manner by which the sealing ring is yieldingly held in place.
Figure 5:
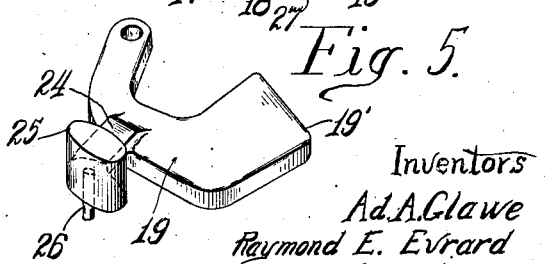
Fig. 5 is a detail perspective view of one of the latch elements.

To provide a finished appearance for the closure cap, and to prevent unauthorized tampering with same, a cover 39 is provided, it being secured to the sleeve element 11 by means of countersunk screws 41. The downwardly extending flange 42, of the cover, is of sufficient depth to over-lie the sealed edge of the opening as shown in Figures 2 and 6, and of a diameter to provide a close fit over said filling neck.

It is apparent that with a closure cap of this construction, the cap is securely locked in place at all times, the locking mechanism being automatic in operation. The construction is such that the closure cap will withstand the hard usage to which they are usually subjected, the entire mechanism being encased within the sleeve element. A plate 43 is provided on the lower end of the sleeve element and secured thereto by means of screws, or the like, to further protect the operating parts.

Claimed:

1. In a device of the class described, a lock, an eccentric member actuated by said lock, a pair of latch members, one of said latch members having an extension adapted to cooperate with said eccentric member, a pin on said extension, and an extension on the other latch member having a slot therein adapted to be engaged by said pin as a means of operatively connecting the two.

2. In a device of the class described, having in combination a sleeve-like barrel, a lock member in one end of said barrel, a pair of latch members pivotally secured near the other end of said barrel, means for normally holding said latch members in extended position, and cam means carried by said lock adapted for contacting engagement with said latch members for moving them to a withdrawn or unlocked position.

3. A cap for the filling neck of a tank having in combination, a sleeve-like barrel, a lock in said barrel, a shaft on said lock having an eccentric member mounted thereon, a plurality of latch members normally held in extended position, said eccentric member being adapted for contacting engagement with said latch members for moving the said latch members to a withdrawn position.

4. A closure cap for the filling neck of a tank, comprising a sleeve-like barrel, a shoulder near the upper end of said barrel, an annular sealing ring below said shoulder and adapted for sealing the upper edge of said filling neck, pins by which said ring is supported from said shoulder, a plurality of compression springs on said pins for maintaining said ring in spaced relation with said shoulder and for forcing said ring against the upper edge of said filling neck, and means for locking said barrel within the filling neck.

5. A closure cap of the character described, adapted for insertion in the usual filling neck of a tank having an annular ring secured to the interior wall thereof, comprising, in combination, latch members carried by said cap for engaging the underside of said ring for locking the said cap in operative position, extensions carried by said latch members, a lock in said cap, and a cam actuated by said lock adapted to contact with said extensions for moving said latch members out of engagement with said ring, whereby the said closure cap may be removed from said filling neck.

6. A cap for a filling neck of a tank, having in combination, a sleeve-like barrel, a lock in said barrel, a shaft on said lock having an eccentric member mounted thereon, a plurality of latch members normally held in extended position, said eccentric member being adapted for contacting engagement with said latch members for moving the said latch members to a withdrawn position, and means carried by said cap for securely sealing the filling neck when said cap is in locked position.

In testimony whereof we affix our signatures.

AD A. GLAWE.
RAYMOND E. EVRARD.
JOHN H. ANDREW.